UNITED STATES PATENT OFFICE.

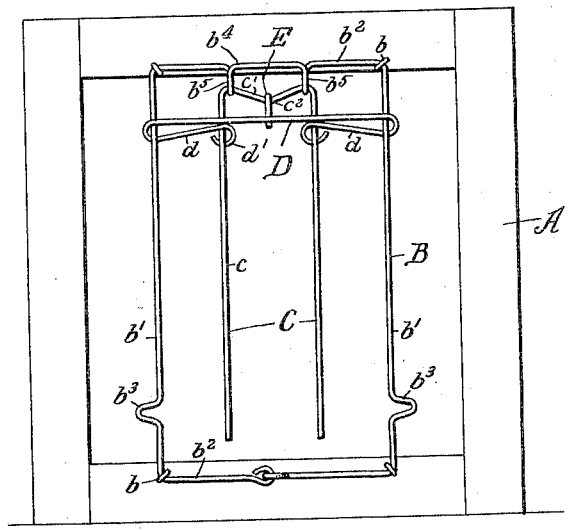
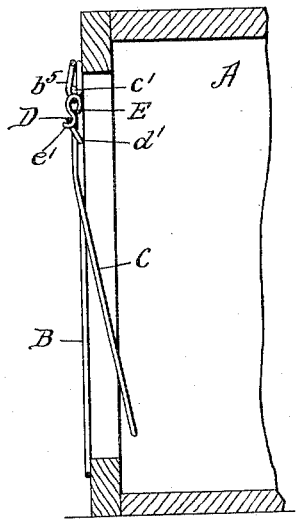
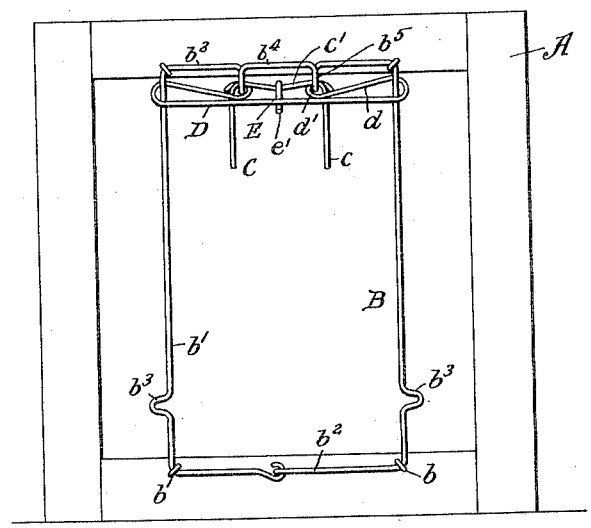
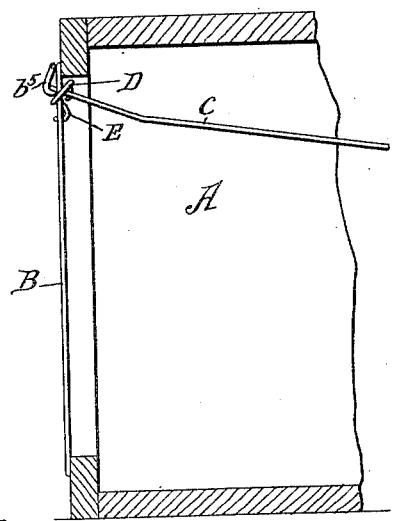

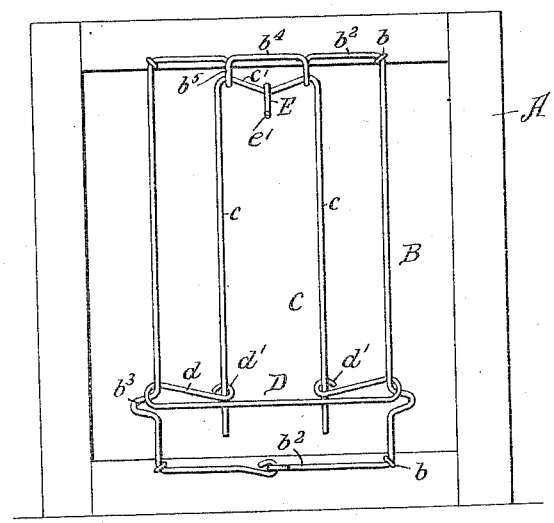
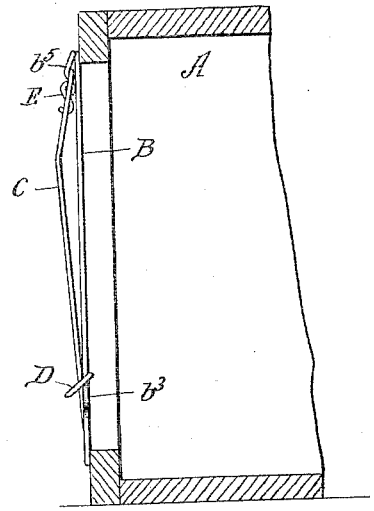
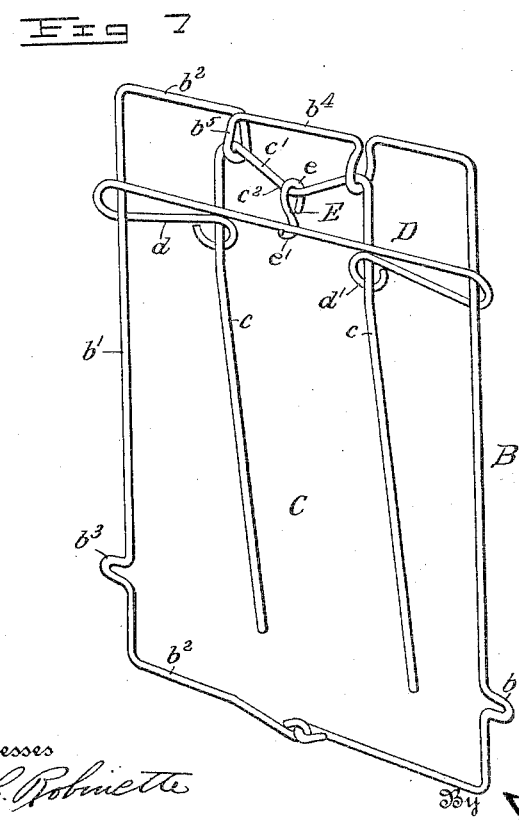
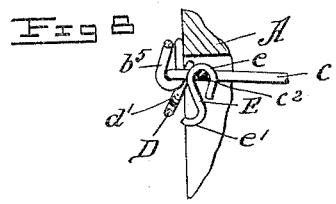
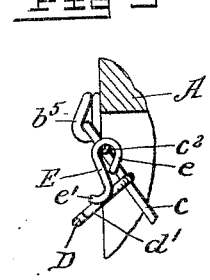

WILLIAM F. MAHONY, OF WASHINGTON, DISTRICT OF COLUMBIA.

POULTRY-TRAP-NEST FRONT.

1,081,317.   Specification of Letters Patent.   Patented Dec. 16, 1913.

Application filed March 8, 1913. Serial No. 752,883.

*To all whom it may concern:*

Be it known that I, WILLIAM F. MAHONY, a citizen of the United States, residing at Washington, in the District of Columbia, have invented new and useful Improvements in Poultry-Trap-Nest Fronts, of which the following is a specification.

This invention relates to trap nests and more particularly to a novel gate to be tripped by the fowl entering the nest so that the gate automatically closes and traps the fowl in the nest.

An object of this invention is to provide a gate which when set is partly open so as to lure the fowl into the nest, and which is swung by the fowl as it passes into the nest. The gate is provided with a locking device which is tripped by the opening of the gate and which moves into position when the gate is released to prevent the gate from again opening in either direction.

Simplicity and durability in the structure, and economy in the production of the device, are important features of this invention, it being designed to produce a device made wholly from several lengths of wire of the same thickness which is peculiarly bent to form the several parts of the device.

In carrying out the above enumerated objects of the invention, the device, broadly, comprises a wire frame, a wire gate hinged in the frame, a wire locking bar looped about the frame and the gate and slidable on the same, and a wire bar-retaining device at the hinged end of the gate to hold the bar thereat and permit the free swinging of the gate, the gate having connection with the bar-retaining device to trip the device when the gate is opened to a considerable extent and release the bar to move toward the free end of the gate and lock the latter in a closed position.

Other objects and advantages of this invention will appear from the following detail description of one embodiment of this invention, and from the hereinafter referred to illustration in the accompanying drawing in which—

Figure 1 is a front elevation of a nest trap showing the gate of this invention in a set or partially opened position. Fig. 2 is a central vertical section through the forward end of the nest trap and gate in the position shown in Fig. 1. Fig. 3 is a view similar to Fig. 1 but showing the gate wide open. Fig. 4 is a vertical section through the trap nest showing in side elevation the gate wide open as in Fig. 3. Fig. 5 is a view similar to Fig. 1 but showing the gate closed and locked. Fig. 6 is a central vertical section through Fig. 5 showing the gate closed and locked. Fig. 7 is an enlarged perspective view of the device of this invention, the same being set and ready to receive a fowl. Fig. 8 is a detail enlarged sectional fragmentary view of the gate in wide open position and showing the locking bar and bar retaining device in their corresponding positions. Fig. 9 is a view similar to Fig. 8 but showing the gate swung partly down into closed position and showing the released locking bar removed from the bar retaining device.

Referring to the drawings in which like characters designate similar parts throughout the several views, A designates a nest box of any approved type, provided at its forward end with an opening over which is secured the improved gate of this invention.

With particular reference to Figs. 1 to 6 inclusive, the invention comprises a frame B secured to the forward end of the nest box A by staples $b$ or the like, a gate C hung in the frame B, a locking bar D is mounted on the frame and the gate, and a bar retaining or supporting device E is carried at the top of the gate and engages the bar, all as hereinafter specifically described.

As may best be seen in Fig. 7, the frame B comprises a length of wire bent to provide side bars $b^1$ and upper and lower end bars $b^2$. The ends of the length of wire forming the frame B are joined at any suitable part of the frame, preferably intermediate of the lower end bar $b^2$. The side bars $b^1$ are provided with outwardly looped lugs $b^3$ which register and project from the opposite sides of the frame B. The middle portion of the upper end bar $b^2$ is offset downwardly as at $b^4$, and said offset part $b^4$ is bent up upon itself as shown, to provide a pair of spaced apart hinged loops $b^5$.

Hinged in the frame B is a gate C. This gate comprises a single length of wire bent substantially U-shape to provide a pair of spaced apart fingers $c$ and an intermediate cross-bar $c^1$. The cross-bar $c^1$ engages at its opposite ends through the hinged loops $b^5$ of the frame and the fingers $c$ which are downturned from the cross-bar $c^1$ against the outer sides of the loops $b^5$, extend down toward the bottom of the frame and have their ends when the gate is closed spaced slightly above the lower end bar $b^2$. The middle portion of the cross-bar $c^1$ is offset or bent, as at $c^2$, preferably in the plane of the fingers $c$, and downwardly there-between for a purpose hereinafter set forth.

The locking bar D comprises a single length of wire engaging across the front of the frame and the gate and having its ends looped backwardly as at $d$ about the side bars $b^1$ to hold the bar D upon the frame, and at the same time to permit of the free movement of the bar vertically upon the frame. The extremities of this length of wire are curled over upon themselves about the fingers $c$ of the gate to provide eyes $d^1$ through which the fingers freely engage. The lugs $b^3$ of the frame support the loops $d$ of the locking bar and hold it in its lowermost position whereby to secure the gate from swinging movement in either direction.

The bar retaining or supporting device E is made of a short length of wire having its upper end overturned to provide a loop $e$ engaging about the offset portion $c^2$ of the gate and being provided upon its lower end with an out-turned hook $e^1$.

It will of course be understood that the parts above described may be modified in construction to provide the frame and gate with additional pairs of fingers to accommodate openings of various sizes, and the locking bar and the trip may also be bent in any manner found desirable. The device may also be constructed of other material and the invention is not necessarily limited to a device made from wire, although it is found to be commercially and practically desirable.

In the use of this improved gate the corners of the frame B are fastened to the upper and lower parts of the nest box A, as shown in Fig. 1, so that the frame B and the gate C stretch over the opening in the nest box A and form a closure preventing the egress of the fowl when the gate is locked. To set the trap the locking bar D is moved up upon the frame B and gate C and the intermediate portion of the bar D is engaged over the hook $e^1$ of the supporting device E. Figs. 1 and 2 of the drawings disclose this position of the parts to advantage and it will be seen that the locking bar is suspended at the upper end of the gate and that the gate is free to swing upon the hinged loops $b^5$. The lower ends of the fingers $c$ are bent inwardly to any desired extent, so as to provide for an opening at the bottom of the gate adapted to lure the fowl into the nest and to indicate that the gate is open. As the fowl passes through the frame B and strikes against the gate C the gate is swung inwardly and up effecting a crank movement of the offset portion $c^2$ of the cross-bar $c^1$ of the gate and binding the fingers $c$ of the gate against the eyes $d^1$ of the locking bar whereby the locking bar is forced upwardly upon the frame B toward the plane of the hinged support of the gate. This raised position of the gate C is best shown in Figs. 3, 4 and 8 where the bar retaining device is moved inwardly away from the locking bar D, and the locking bar D is elevated to a position above the hook $e^1$ so as to release the latter.

The retaining device E now swings inwardly away from the locking bar and when the gate C is released and allowed to drop, as shown in Fig. 9, the locking bar D moves downwardly in a plane forwardly of the retaining device E, the locking bar falling to the bottom of the frame and resting on the lugs $b^3$. This movement of the locking bar draws the eyes $d^1$ down over the fingers $c$, and when the locking bar strikes the lugs the eyes are so disposed as to hold the gate from swinging in either direction when pressure is exerted against either side of the gate. In this manner a fowl is locked in the nest box A and cannot escape and at the same time other fowls cannot enter the nest box. The bar retaining device E supports in a suspended position the locking bar and as soon as this trip is released from the bar the bar falls by gravity to the lower end of the frame and by its weight draws the fingers $c$ of the gate into the plane of the frame.

What is claimed is—

1. In combination with a nest box, a frame secured over the open end of the box, a gate hung in the frame, a locking device on the frame, and supporting means connected to the gate and normally engaging the locking device to hold the locking device restricted, said gate being adapted to be swung open by the fowl entering the nest box to release the supporting means from the locking device whereby the locking device may operate to lock the gate closed when the gate swings to closed position.

2. In a device as specified, a frame, a gate hinged in the frame, a locking bar movable on the frame, and a supporting device carried by the gate and engaging the locking bar, said gate being adapted to be opened whereby to release said supporting device from the locking bar, said locking bar when released being adapted to drop into locked position.

3. In a device as specified, a frame, a locking bar slidable vertically upon the frame, a gate hinged in the upper end of the frame and adapted to hang down within the frame, a hook carried upon the upper end of the gate and adapted to engage said locking bar to hold the same in the upper end of the frame, said locking bar having sliding engagement with the gate, said gate being adapted to be swung open whereby to release said hook from said bar, said bar being adapted to drop to the lower end of the frame and hold said gate closed.

4. In a device as specified, a pair of side bars, a gate hinged between the side bars and having depending fingers, a locking bar looped about said side bars and said fingers and being adapted for vertical sliding movement upon the same, and a retaining device connected to said gate and engaging the locking bar to hold the same at the upper ends of the side bars of the frame whereby said gate is free to swing into open position, said gate being adapted to be swung into open position to release the retaining device from said locking bar whereby said bar is adapted to fall to the lower ends of the side bars and the fingers to lock the gate.

5. In a trap nest, a gate, side bars arranged at the sides of the gate, a locking bar slidable upon said side bars and engaging said gate, and retaining means for the side bars to hold the same at the upper hinged end of the gate whereby to admit of the swinging of the gate, said retaining means being adapted to be tripped by the opening of said gate whereby to release said bar to slide down upon said side bars and said gate.

6. A trap nest including a wire frame, a wire gate hinged in the frame, a wire locking bar slidable on said frame and said gate, and a wire retaining device carried on the gate and engaging said bar to hold the same at the upper hinged end of the gate, said retaining device being offset from the pivotal axis of the gate whereby upon the swinging of the gate said device is released from said bar, said bar when released being adapted to drop toward the lower end of the frame and gate to lock said gate from swinging movement.

7. In a trap nest device, a frame, a gate suspended in the frame, a bar slidable vertically on the frame and having sliding connection with the gate whereby to lock the gate closed when the bar is in a lowered position, and means at the upper end of the frame engaging said bar to hold the same at the top of the frame whereby to free said gate, said gate having connection with said means whereby to release the bar upon the opening of the gate.

8. In combination with a nest box, a frame secured over the open end of the box, a gate hung in the frame, a locking device for the gate, and means on the gate engaging the locking device to hold the same normally inactive, said gate being adapted to be swung open on the entrance of a fowl into the nest box whereby to release the locking device to lock the gate closed when released by the fowl.

In testimony whereof I have hereunto set my hand in presence of two subscribing witnesses.

WILLIAM F. MAHONY.

Witnesses:
A. V. CUSHMAN,
GERTRUDE M. STUCKER.

Copies of this patent may be obtained for five cents each, by addressing the "Commissioner of Patents. Washington, D. C."